(12) United States Patent
Moisin

(10) Patent No.: US 6,222,326 B1
(45) Date of Patent: Apr. 24, 2001

(54) BALLAST CIRCUIT WITH INDEPENDENT LAMP CONTROL

(75) Inventor: Mihail S. Moisin, Brookline, MA (US)

(73) Assignee: Electro-Mag International, Inc., North Scituate, MA (US)

( * ) Notice: Subject to any disclaimer, the term of this patent is extended or adjusted under 35 U.S.C. 154(b) by 0 days.

(21) Appl. No.: 09/390,073

(22) Filed: Sep. 3, 1999

Related U.S. Application Data

(63) Continuation-in-part of application No. 09/173,977, filed on Oct. 16, 1998, now Pat. No. 6,137,233.

(51) Int. Cl.⁷ .................................................. H05B 37/02
(52) U.S. Cl. ...................................... 315/209 R; 315/161
(58) Field of Search .............................. 315/209 R, 160, 315/161, 189, 224, 225, 226, 291, 307, DIG. 5, DIG. 7, 205

(56) References Cited

U.S. PATENT DOCUMENTS

| | | | |
|---|---|---|---|
| 3,808,481 | 4/1974 | Rippel | 318/139 |
| 4,115,729 | 9/1978 | Young et al. | 322/86 |
| 4,164,785 | 8/1979 | Young et al. | 363/50 |
| 4,270,164 | 5/1981 | Wyman et al. | 363/56 |
| 4,415,839 | 11/1983 | Lesea | 315/308 |
| 4,423,363 | 12/1983 | Clark et al. | 318/375 |
| 4,480,298 | 10/1984 | Fry | 363/28 |
| 4,489,373 | 12/1984 | du Parc | 363/56 |
| 4,507,698 | 3/1985 | Nilssen | 361/42 |
| 4,525,648 | 6/1985 | De Bijl et al. | 315/224 |
| 4,572,988 | 2/1986 | Handler et al. | 315/209 R |
| 4,608,958 | 9/1986 | Sakakibara et al. | 123/605 |
| 4,618,810 | 10/1986 | Hagerman et al. | 318/803 |
| 4,624,334 | 11/1986 | Kelledes et al. | 180/79.1 |
| 4,675,576 | 6/1987 | Nilssen | 315/242 |
| 4,682,083 | 7/1987 | Alley | 315/307 |
| 4,684,851 | 8/1987 | Van Meurs | 315/224 |
| 4,712,045 | 12/1987 | Van Meurs | 315/224 |

(List continued on next page.)

FOREIGN PATENT DOCUMENTS

| | | | |
|---|---|---|---|
| 4010435 | 10/1991 | (DE) | H05B/41/29 |
| 4032664 | 4/1992 | (DE) | H05B/41/29 |
| 19502772 | 8/1996 | (DE) | H05B/41/29 |
| 0460641 | 12/1991 | (EP) | H05B/41/29 |
| 0522266 | 1/1993 | (EP) | H05B/41/16 |
| 1161948 | 8/1969 | (GB) | H05B/41/16 |
| 2204455 | 11/1988 | (GB) | H05B/41/16 |
| 2215535 | 9/1989 | (GB) | H05B/41/231 |
| 63-002464 | 11/1988 | (JP) | H02H/9/08 |
| 9422209 | 9/1994 | (WO) | H05B/41/16 |
| 9427419 | 11/1994 | (WO) | H05B/41/16 |
| 9535646 | 12/1995 | (WO) | H05B/41/16 |

OTHER PUBLICATIONS

Kazimierczuk, Marian et al. "*Resonant Power Converters*", (1995), A Wiley–Interscience Publication, pp. 332–333.

"Simple Dimming Circuit for Fluorescent Lamp", IBM Technical Disclosure Bulletin, vol. 34, No. 4A, Sep. 1, 1991, pp. 109–111, XP000210848.

*Primary Examiner*—Don Wong
*Assistant Examiner*—Thuy Vinh Tran
(74) *Attorney, Agent, or Firm*—Nutter, McClennen & Fish, LLP

(57) ABSTRACT

A ballast circuit independently energizes first and second lamps. In one embodiment, an inverter provides a drive signal for energizing the first and second lamps. A first signal detection circuit detects a first AC input signal and a second signal detection circuit detects a second AC input signal, each of which energizes a respective one of first and second lamps. A first lamp control circuit receives a signal from the first signal detector such that the first lamp is energized by the drive signal when the first AC input signal is present. Similarly, a second lamp control circuit receives a signal from the second signal detector such that the second lamp is energized by the drive signal when the second AC input signal is present.

34 Claims, 8 Drawing Sheets

U.S. PATENT DOCUMENTS

| | | | |
|---|---|---|---|
| 4,783,728 | 11/1988 | Hoffman | 363/37 |
| 4,818,917 | 4/1989 | Vest | 315/171 |
| 4,864,486 | 9/1989 | Spreen | 363/126 |
| 4,866,586 | 9/1989 | Suko | 363/5 |
| 4,870,327 | 9/1989 | Jorgensen | 315/307 |
| 4,899,382 | 2/1990 | Gartner | 379/413 |
| 4,952,853 | 8/1990 | Archer | 318/254 |
| 4,991,051 | 2/1991 | Hung | 361/57 |
| 5,003,231 | 3/1991 | Perper | 315/291 |
| 5,004,955 | 4/1991 | Nilssen | 315/119 |
| 5,014,305 | 5/1991 | Moisin | 379/402 |
| 5,027,032 | 6/1991 | Nilssen | 315/103 |
| 5,052,039 | 9/1991 | Moisin | 379/402 |
| 5,063,339 | 11/1991 | Orii et al. | 318/696 |
| 5,081,401 | 1/1992 | Moisin | 315/324 |
| 5,111,114 * | 5/1992 | Wang | 315/225 |
| 5,124,619 | 6/1992 | Moisin et al. | 315/219 |
| 5,138,233 | 8/1992 | Moisin et al. | 315/187 |
| 5,138,234 | 8/1992 | Moisin | 315/209 R |
| 5,138,236 | 8/1992 | Bobel et al. | 315/209 R |
| 5,144,195 | 9/1992 | Konopka et al. | 315/94 |
| 5,148,087 | 9/1992 | Moisin et al. | 315/291 |
| 5,173,643 | 12/1992 | Sullivan et al. | 315/276 |
| 5,177,408 | 1/1993 | Marques | 315/291 |
| 5,191,263 | 3/1993 | Konopka | 315/209 R |
| 5,216,332 | 6/1993 | Nilssen | 315/224 |
| 5,220,247 | 6/1993 | Moisin | 315/209 R |
| 5,223,767 | 6/1993 | Kulka | 315/209 R |
| 5,256,939 | 10/1993 | Nilssen | 315/244 |
| 5,291,382 | 3/1994 | Cohen | 363/16 |
| 5,309,066 | 5/1994 | Ditlevsen | 315/205 |
| 5,313,143 | 5/1994 | Villa-Masot et al. | 315/209 R |
| 5,315,533 | 5/1994 | Stich et al. | 364/480 |
| 5,332,951 | 7/1994 | Turner et al. | 315/209 R |
| 5,334,912 | 8/1994 | Counts | 315/119 |
| 5,363,020 * | 11/1994 | Chen et al. | 315/209 R |
| 5,390,231 | 2/1995 | Hung et al. | 379/2 |
| 5,399,943 | 3/1995 | Chandrasekaran | 315/219 |
| 5,416,388 | 5/1995 | Shackle | 315/219 |
| 5,432,817 | 7/1995 | Hormel et al. | 375/257 |
| 5,434,477 * | 7/1995 | Crouse et al. | 315/209 R |
| 5,434,480 | 7/1995 | Bobel | 315/224 |
| 5,444,333 | 8/1995 | Lau | 315/94 |
| 5,446,365 | 8/1995 | Nomura et al. | 320/14 |
| 5,481,160 | 1/1996 | Nilssen | 315/209 R |
| 5,493,180 | 2/1996 | Bezdon et al. | 315/91 |
| 5,504,398 | 4/1996 | Rothenbuhler | 315/209 R |
| 5,515,433 | 5/1996 | Chen | 379/398 |
| 5,563,479 | 10/1996 | Suzuki | 318/139 |
| 5,574,335 * | 11/1996 | Sun | 315/307 |
| 5,579,197 | 11/1996 | Mengelt et al. | 361/93 |
| 5,583,402 | 12/1996 | Moisin et al. | 315/307 |
| 5,608,295 * | 3/1997 | Moisin | 315/209 R |
| 5,608,595 | 3/1997 | Gourab et al. | 361/79 |
| 5,638,266 | 6/1997 | Horie et al. | 363/132 |
| 5,684,683 | 11/1997 | Divan et al. | 33/65 |
| 5,686,799 | 11/1997 | Moisin et al. | 315/307 |
| 5,691,603 | 11/1997 | Nilssen | 315/209 |
| 5,691,606 | 11/1997 | Moisin et al. | 315/307 |
| 5,719,471 | 2/1998 | Kachmarik | 315/209 |
| 5,729,098 * | 3/1998 | Konopka et al. | 315/DIG. 5 |
| 5,747,942 * | 5/1998 | Ranganath | 315/224 |
| 5,754,036 * | 5/1998 | Walker | 323/237 |
| 5,798,617 | 8/1998 | Moisin | 315/247 |
| 5,821,699 | 10/1998 | Moisin | 315/291 |
| 5,825,136 | 10/1998 | Rudolph | 315/291 |
| 5,831,396 | 11/1998 | Rudolph | 315/307 |
| 5,866,993 | 2/1999 | Moisin | 315/307 |
| 5,920,155 * | 7/1999 | Kanda et al. | 315/307 |
| 5,925,986 | 7/1999 | Moisin | 315/247 |
| 6,034,488 * | 3/2000 | Lindauer et al. | 315/DIG. 7 |
| 6,034,489 * | 3/2000 | Weng | 315/209 R |

\* cited by examiner

BALLAST CIRCUIT WITH INDEPENDENT LAMP CONTROL

CROSS REFERENCE TO RELATED APPLICATION

The present application is a continuation-in-part application of U.S. application Ser. No. 09/173,977, filed on Oct. 16, 1998, now U.S. Pat. No. 6,137,233.

STATEMENT REGARDING FEDERALLY SPONSORED RESEARCH

Not Applicable.

FIELD OF THE INVENTION

The present invention relates to circuits that energize a load, and more particularly, to ballast circuits for energizing a plurality of lamps.

BACKGROUND OF THE INVENTION

There are many types of ballast circuits for energizing devices that emit visible light, such as fluorescent lamps. A so-called electronic ballast receives a relatively low frequency AC (Alternating Current) input signal and provides a relatively high frequency AC output signal to one or more lamps. Typically, the low frequency input signal corresponds to a standard 110 volt, 60 Hz signal which is selectively applied to the ballast by means of a conventional wall switch.

One type of electronic ballast includes a rectifier which receives the AC input signal and provides a DC (Direct Current) signal to an inverter. The inverter can be a resonant inverter which provides a relatively high frequency AC signal to the lamps at operational voltage and current levels which cause the lamps to emit light.

Generally, the ballast is coupled to a source of AC energy via a switch, for example a conventional wall switch, which controls the flow of energy to the ballast for turning the lamps on and off. That is, when the switch is set to an on position the AC signal is applied to the ballast which energizes the lamps such that they emit light. And when the switch is set to an off position, the AC signal is not applied to the ballast and the lamps do not emit light. However, conventional ballasts are not adapted for coupling to more than one AC input signal and do not provide independent control over multiple lamps coupled to the ballast.

It would, therefore, be desirable to provide a ballast circuit adapted for receiving more than one AC input signal and independently controlling a plurality of lamps coupled to the ballast.

SUMMARY OF THE INVENTION

The present invention provides a ballast circuit that allows independent control over a plurality of lamps. Although the invention is primarily shown and described as a ballast for a lamp, it is understood that the invention has other applications as well, such as motor control circuits and voltage regulators.

In one embodiment, a ballast circuit has a plurality of input terminals for coupling to first and second AC energy sources and output terminals for connecting to first and second lamps. The ballast energizes the first lamp when a first AC energy signal, which corresponds to the first AC energy source, is applied to the ballast and energizes the second lamp when a second AC energy signal, which corresponds to the second AC energy source, is applied to the ballast. The ballast controls the flow of energy to each of the first and second lamps independently.

In an exemplary embodiment, the ballast includes a rectifier having AC input terminals coupled to the first and second AC energy sources and DC output terminals coupled to a boost converter. The boost converter provides DC energy to positive and negative rails of the first and second inverters which independently energize a respective one of the first and second lamps. A first control signal path, which provides a path for a first control signal, extends from the rectifier to the first inverter. The first control signal has a state corresponding to the presence of the first AC signal. A second control signal path extends from the rectifier to the second inverter to provide a circuit path for a second control signal. The second control signal has a state which corresponds to the presence of the second AC input signal. The first and second control signals selectively disable a respective one of the first and second inverters.

In an exemplary embodiment, the rectifier includes six rectifying diodes coupled so as to form first, second and third AC input terminals and positive and negative DC output terminals. The AC input terminals are adapted for receiving first and second AC input signals. In one embodiment, the first input terminal is coupled to a first black wire, the second input terminal is coupled to first and second white wires, and the third input terminal is coupled to a second black wire. It is understood that the first and second white wires can comprise a single wire or two wires that are electrically coupled. The first black and white wires (and first AC input signal) can correspond to a first 110 volt, 60 Hz signal and the second black and white wires (and second AC input signal) can correspond to a second 110 volt, 60 Hz signal. The DC output terminals are coupled to a boost converter which energizes the positive and negative rails of the first and second inverters. The first inverter powers a first pair of lamps and the second inverter powers a second pair of lamps.

In one embodiment, the first inverter has first and second switching elements coupled in a half bridge configuration with the conduction state of the switching elements being controlled by respective first and second control circuits. Similarly, the second inverter, also having a half-bridge configuration, has third and fourth switching elements controlled by respective third and fourth control circuits. A first control signal path extends from the first AC input terminal of the rectifier to the first control circuit. When the first AC input signal is not present, the first inverter is disabled by the first control circuit such that the first switching element is prevented from transitioning to a conductive state. And when the first AC signal is present, the first inverter is enabled such that the first control circuit alternately biases the first switching element to conductive and non-conductive states so as to allow resonant operation of the inverter and provide AC energy to the first lamp. Similarly, a second control signal path extends from the third AC input terminal to the third control circuit and the second inverter is enabled by the presence of the second AC input signal at the rectifier.

In an alternative embodiment, a first inductive element is coupled to the first AC input terminal and a second inductive element, which is inductively coupled to the first inductive element, is coupled to the second AC input terminal. A third inductive element, which is inductively coupled to the first and second inductive elements, forms a part of a first inverter disable circuit. Similarly, a fourth inductive element is coupled to the second AC input terminal, a fifth inductive element is coupled to the third AC input terminal, and a sixth inductive element forms a part of a second inverter disable circuit. The sixth inductive element is inductively coupled to the fourth and fifth inductive elements.

When the first and second AC input signals are both present, the flux generated by the first and second inductive elements cancels each other and the flux generated by the fourth and fifth inductors cancels each other. In the case where, the first AC input signal is not present and the second AC input signal is present, the flux generated by the second inductive element is not canceled such that a voltage appears on the third inductive element. This voltage biases a transistor in the first inverter disable circuit to a conductive state for disabling the second switching element, which disables the first inverter. Similarly, when the first AC input signal is present and the second AC input signal is not present, a voltage develops on the sixth inductive element that disables the second inverter. Thus, the first AC input signal energizes the first lamp and the second AC input signal energizes the second lamp independently of each other.

In a further embodiment of the invention, a ballast includes a first lamp control circuit coupled to a first lamp and a second lamp control circuit coupled to a second lamp. A first signal detector circuit is adapted for receiving a first AC input signal and a second signal detector is adapted for receiving a second AC input signal. The first signal detector provides a signal to the first lamp control circuit indicating whether the first AC input signal is present. In one embodiment, a single inverter energizes both the first and second lamps with a common drive signal. When the first AC signal is present, the first lamp control circuit allows the first lamp to be energized. Similarly, the second signal detector provides a signal to the second lamp control circuit to energize the second lamp when the second AC input signal is present.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
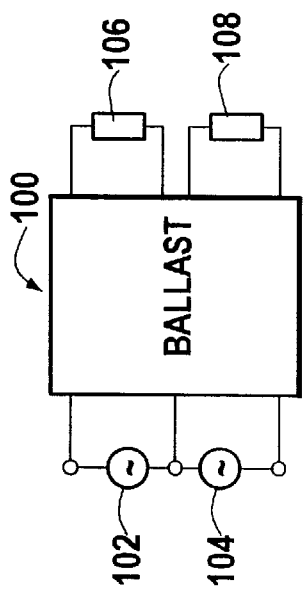
FIG. 1 is a schematic block diagram of a ballast circuit in accordance with the present invention.

FIG. 1 shows a ballast circuit 100 coupled to first and second AC energy sources 102,104 and to first and second lamps 106,108. The first energy source 102 provides a first AC input signal and the second AC energy source 104 provides a second AC input signal. The first AC input signal enables the ballast to energize the first lamp 106 and the second AC input signal enables the ballast to energize the second lamp 108. As described below, the ballast 100 independently energizes each of the first and second lamps 106,108.

Figure 2:
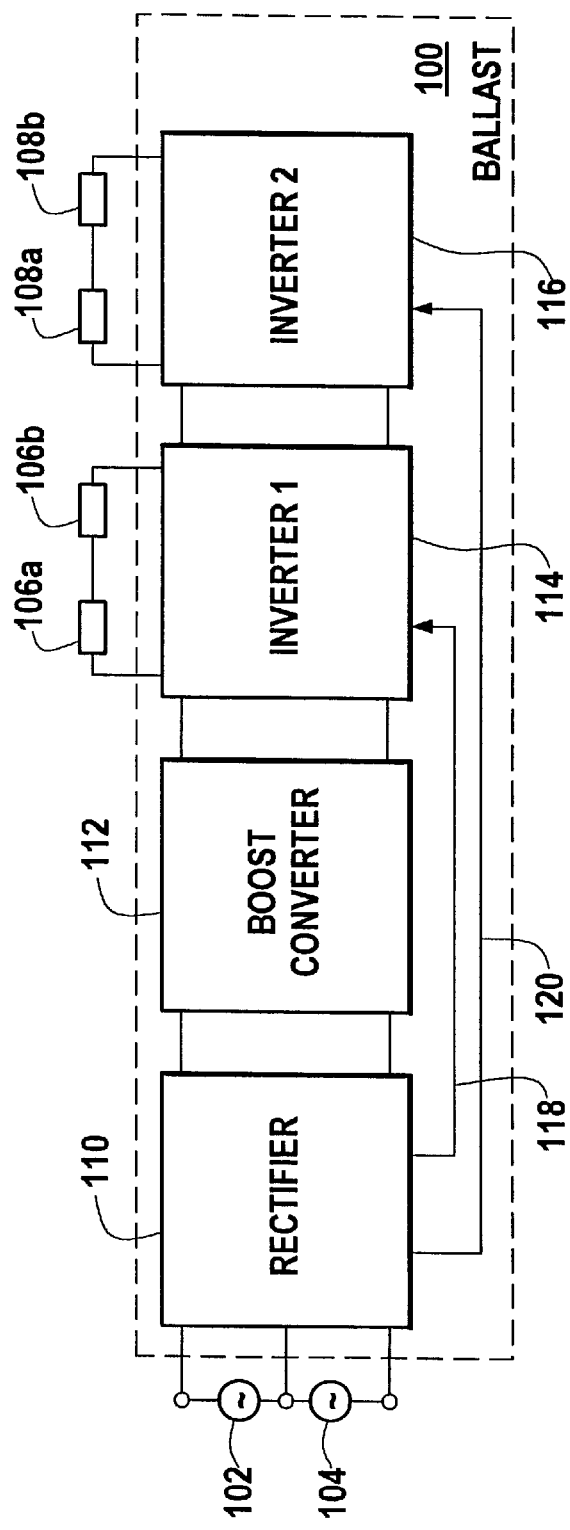
FIG. 2 is a schematic block diagram showing further details of the ballast circuit of FIG. 1.

As shown in FIG. 2, the ballast circuit 100 includes a rectifier 110 for receiving the first and second AC input signals and for providing DC energy to a boost converter 112. The boost converter 112 provides DC signal levels to first and second inverters 114,116 which energize first and second pairs of lamps 106a,b,108a,b, respectively. The rectifier 110 also provides a first control signal to the first inverter 114 via a first control signal path 118, and a second control signal to the second inverter 114 via a second control signal path 120. The first control signal 118 is indicative of whether the first AC input signal is being applied to the rectifier and the second control signal 120 is indicative of whether the second AC input signal is present. The first and second controls signals are effective to selectively enable the inverters to control the flow of energy to the lamps 106,108.

Figure 3:
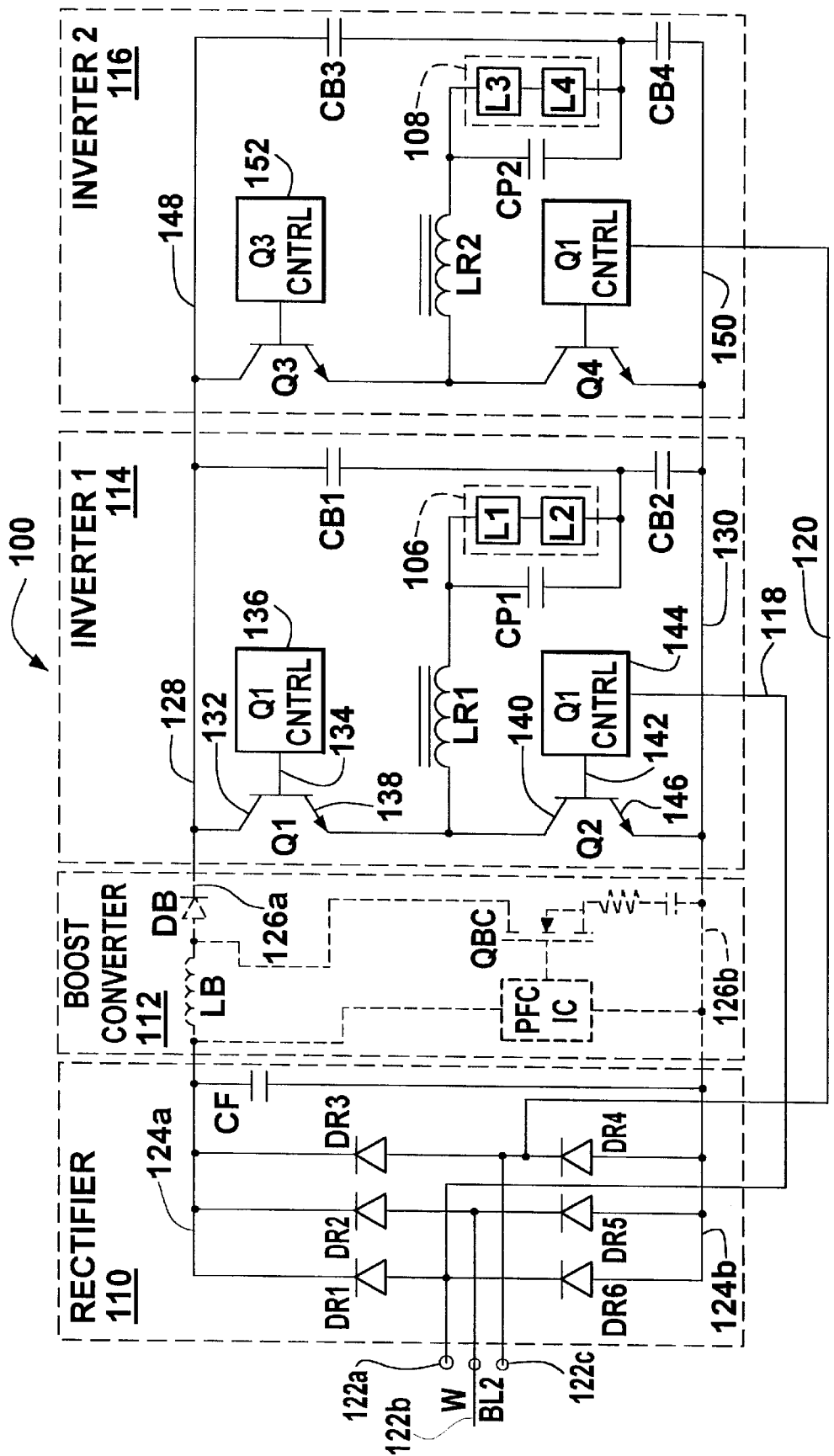
FIG. 3 is a circuit diagram of an exemplary embodiment of the ballast of FIG. 1.

FIG. 3 shows an exemplary circuit implementation of the ballast circuit 100 of FIG. 2, wherein like reference designations indicate like elements. The rectifier 110 includes six rectifying diodes DR1–6 coupled so as to provide first, second, and third AC input terminals 122a,b,c and first and second DC output terminals 124a,b. The first AC input terminal 122a is located between the first and sixth rectifying diodes DR1,DR6, which are coupled end-to-end between the DC output terminals 124a,b. Similarly, the second AC input terminal 122b is located between the second and fifth rectifying diodes DR2,DR5 and the third AC input terminal 122c is located between the third and fourth rectifying diodes DR3,DR4. In an exemplary embodiment, the first AC input terminal 122a is coupled to a first black wire BL1, the second input terminal 122b is coupled to white wire W12, and the third input terminal 122c is coupled to a second black wire BL2. The first AC signal can be provided as a conventional 110 volt, 60 Hz signal transmitted via the first black and white wires BL1,W12 and the second AC signal can also be provided as a 110 volt, 60 Hz signal transmitted via the second black and white wires BL2,W12. It is understood that the white wire W12 can comprise a single wire or a pair of electrically coupled wires, such as, a first white wire corresponding to the first black wire BL1 and a second white wire corresponding to the second black wire BL2.

The DC output terminals 124a,b of the rectifier 110 are coupled to the optional boost converter 112. The boost converter 112 is effective to boost the voltage of the DC signal provided to the inverters 114,116 and to provide power factor correction. Boost converters are well known to one of ordinary skill in the art. In one embodiment shown in phantom, the boost converter 112 includes a power factor correction integrated circuit PFC IC coupled to a FET (field effect transistor) QBC for controlling a conduction state of the FET. The power factor correction integrated circuit can be of the type manufactured by SGS-Thomson Microelectronics of Schaumburg, Ill., and identified as L6560, L6560A, and L6561. The boost converter 112 further includes a boost inductor LB and a diode DB which form a series circuit path from the rectifier output terminal 124a to the first inverter 114. The boost converter 112 includes a first output terminal 126a coupled to a positive rail 128 of the first inverter 114 and a second output terminal 126b coupled to a negative rail 130 of the first second inverter.

The first inverter 114 is shown having first and second switching elements Q1,Q2 coupled in a half bridge arrangement. However, it is understood that other inverter configurations are possible, such as full bridge topologies. The first switching element Q1, shown as a transistor, has a collector terminal 132 coupled to the positive rail 128 of the inverter 114, a base terminal 134 coupled to a first or Q1 control circuit 136, and an emitter terminal 138 coupled to the second switching element Q2. The second switching element Q2 has a collector terminal 140 coupled to the emitter terminal 138 of the first switching element Q1, a base terminal 142 coupled to a second or Q2 control circuit 144, and an emitter terminal 146 coupled to the negative rail 130 of the inverter 114. The conduction state of the first switching element Q1 is controlled by the first control circuit 136 and the conduction state of the second switching element Q2 is controlled by the second control circuit 144.

The first inverter 114 further includes a first resonant inductive element LR1 coupled at one end to a point between the switching elements Q1,Q2 and at the other end to a first parallel capacitor CP1. The lamps in the first pair of lamps 106 (first lamp 106a, second lamp 106b) are coupled end-to-end such that the lamps are connected in parallel with the first parallel capacitor CP1. First and second bridge capacitors CB1,CB2 are coupled end-to-end between the positive and negative rails 128,130 of the inverter. The junction of the second lamp 106b and the parallel capacitor CP1 is coupled to a point between the first and second bridge capacitors CB1,CB2.

The second inverter 116 has a configuration that mirrors that of the first inverter 114. Third and fourth switching elements Q3,Q4 are coupled in a half bridge configuration between the positive and negative rails 148,150 of the second inverter 116 with conduction states determined by third and fourth control circuits 152,154 respectively. A resonant circuit is formed by a second resonant inductive element LR2, a second parallel capacitor CP2 and the second pair of lamps 108 (third lamp 108a, fourth lamp 108b). Third and fourth bridge capacitors CB3,CB4 are coupled end-to-end across the rails 148,150 of the second inverter 116 with a lamp current path connected to a point between the bridge capacitors CB3,CB4.

The first control path 118, which provides a signal path for the first control signal, extends from the first input terminal 122a of the rectifier 110 to the second control circuit 144. The second control path 120, which provides a signal path for the second control signal, extends from the third input terminal 122c to the fourth control circuit 154. The first control signal is indicative of whether the first AC input signal (on wires BL1,W12) is being applied to the first and second input terminals 122a,b of the rectifier. And the second control signal corresponds to whether the second AC input signal (on wires BL2,W12) is present on the second and third terminals 122b,c of the rectifier. The first and second control signals provide independent control over the first and second inverters 114,116. That is, the first inverter 114 can energize the first pair of lamps 106 when the first AC input signal is present. And the second inverter 116 can energize the second pair of lamps 108 when the second AC signal is present.

In operation, the first and second inverters 114,116 each operate at or about a characteristic resonant frequency which is determined by the impedances of the various circuit elements, such as the respective resonant inductive elements, LR1,LR2, parallel capacitors CP1,CP2 and lamps 106,108. For the first inverter 114, current through the lamps 106 flows in a first direction while the first switching element Q1 is conductive and in a second, opposite direction when the second switching element Q2 is conductive. The current periodically reverses direction as determined by the resonant frequency of the circuit. The first and second control circuits 136,144 control the respective conduction states of the first and second switching elements Q1,Q2 to facilitate resonant operation of the circuit.

When the first AC input signal is applied to the rectifier 110, the first control signal, via the first control path 118, enables the second control circuit 144 to bias the second switching element to the conductive state. Thus, when the first AC signal is present the first inverter 114 is enabled to resonate such that the ballast energizes the first pair of lamps 106 with AC energy which causes the lamps to emit light.

When the first AC signal is not present at the rectifier 110, the first control signal conveys this information to the second control circuit 144 which prevents the second switching element Q2 from transitioning to a conductive state. Thus, the first inverter 114 cannot resonate and is thereby disabled when the first AC signal is not applied to the rectifier 110. With the first inverter disabled, the first pair of lamps 106 is not energized.

Similarly, when the second AC input signal is present at the rectifier 110, the second control signal, via the second control path 120, enables the fourth control circuit 154 to bias the fourth switching element Q4 to a conductive state for resonant operation of the second inverter 116. And when the second AC input signal is not present, the fourth control circuit 154 prevents the turning on of the fourth switching element Q4 thereby disabling the second inverter 116.

Figure 4:
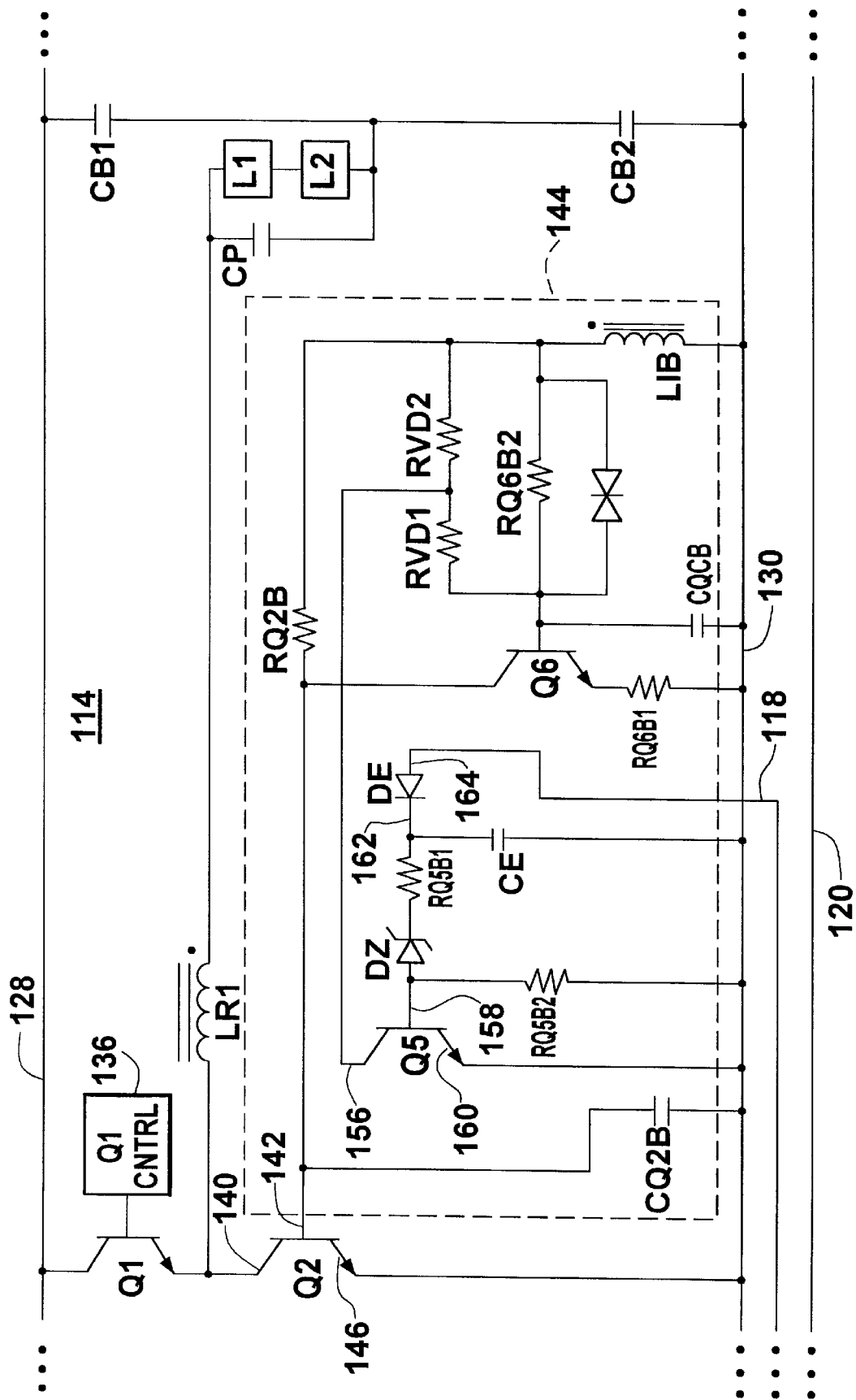
FIG. 4 is a circuit diagram showing further details of the circuit of FIG. 3.

FIG. 4 shows an exemplary embodiment of the second control circuit 144 of FIG. 3, wherein like reference designations indicate like elements. The second control circuit 144 includes fifth and sixth switching elements Q5,Q6 that are effective to enable the second switching element Q2 to transition to a conductive state when the first AC signal is present on the first control path 118. In general, when the fifth switching element Q5 is conductive (i.e., the first AC signal is present) the second switching element Q2 can transition to a conductive state to achieve resonant operation of the first inverter 114. And when the fifth switching element Q5 is not conductive (i.e., the first AC signal is not present), the sixth switching element Q6 transitions to a conductive state which prevents the second switching element Q2 from transitioning to a conductive state, thereby disabling the first inverter 114.

It is understood that a control path indicating the presence of an AC signal at the rectifier can be coupled to either or both of the first and second control circuits 136,144. It is further understood that the second control path 120 is coupled to the second inverter 116 (FIG. 3) for selectively enabling the third and/or fourth switching elements Q3,Q4.

In the exemplary embodiment of FIG. 4, the second control circuit 144 includes a first capacitor CQ2B coupled at one terminal to the base terminal 142 of the second switching element Q2 and at the other terminal to the negative rail 130 of the first inverter. A first resistor RQ2B and inductive bias element L1B provide a series circuit path from the base terminal 142 to the negative rail 130. The bias element L1B is inductively coupled to the first resonant inductive element L1R such that current flow through the first resonant inductive element L1R induces a corresponding voltage in the bias element L1B which biases the base terminal 142 of the second switching element Q2. As known to one of ordinary skill in the art, as current flow through the first resonant inductive element L1R periodically reverses direction due to resonance of the circuit, the corresponding voltage induced at the bias element L1B is effective to alternately bias the second switching element to conductive and non-conductive states.

The fifth switching element Q5, shown as a transistor, has a collector terminal 156 coupled to a point between first and second voltage dividing resistors RDV1,RVD2, a base terminal 158, and an emitter terminal 160. A zener diode DZ, a second resistor RQ5B1 and an enable capacitor CE provide a series circuit path from the base terminal 158 of the fifth switching element Q5 to the negative rail 130 of the first inverter 114. A third resistor RQ5B2 is coupled between the base terminal 158 and the negative rail 130. An enable diode DE has a cathode 162 coupled to the enable capacitor CE and an anode 164 coupled to the first control path 118 which extends to a point between the first and sixth diodes DR1, DR6, i.e., the first AC input terminal 122a of the rectifier 110 (FIG. 3).

The sixth switching element Q6 has a collector terminal 166 coupled to the base terminal 142 of the second switching element Q2, a base terminal 168 coupled to an RC network, and an emitter terminal 170 coupled to the negative rail 130 via a resistor RQ6B1. A capacitor CQ6B is coupled between the base terminal 168 and the negative rail 130. A first series circuit path extends from the base terminal 168 through the first and second voltage resistors RVD1,RVD2, and the bias element L1B to the negative rail 130. A second series circuit path extends from the base terminal 168 through a resistor RQ6B2 and the bias element L1B to the negative rail 130. A diac DD1 is coupled at one terminal to the base terminal 168 and to the bias element L1B at the other terminal.

Referring now to FIG. 4 in combination with FIG. 3, when the first AC input signal, via the first black and white wires BL1,W12, is applied to the first and second input terminals 122a,b of the rectifier 110, the first control signal path 118 provides this AC signal to the second control circuit 144. The AC signal is rectified by the enable diode DE and the enable capacitor CE is charged to a predetermined voltage level. When the enable capacitor CE is charged to level greater than a voltage threshold associated with the zener diode DZ, the base of the fifth switching element Q5 is biased with a positive potential that is effective to transition Q5 to a conductive state. And when Q5 is conductive, the sixth switching element Q6 is prevented from transitioning to a conductive state. The sixth switching element Q6, when it is in the conductive state, effectively shorts the second switching element Q2 thereby disabling the first inverter 114. The sixth switching element Q6 can become conductive during operation of the circuit unless the fifth switching element Q5 is turned on by the first AC signal.

The ballast circuit 100 can be coupled to remotely located first and second wall switches which independently control the flow of respective first and second AC signals to the ballast. The ballast independently enables the flow of energy to respective first and second lamps connected to the ballast. The ballast energizes the first lamp when the first AC signal is present and energizes the second lamp when the second AC signal is present. Thus, a single ballast receives first and second AC input signals each of which is effective to energize a respective one of the first and second lamps.

In some areas it is required that, for a light fixture housing four lamps, two of the lamps can be turned off. To fulfill this requirement, a typical configuration includes a first ballast coupled to a first wall switch and a first pair of lamps and a second ballast coupled to a second wall switch and a second pair of lamps. The first wall switch controls the first pair of lamps and the second wall switch controls the second pair of lamps.

In contrast, a ballast 100 in accordance with the present invention can independently energize two sets of lamps housed in a single light fixture. In one embodiment, a first wall switch, which is coupled to the ballast 100, controls a first pair of lamps and a second wall switch, which is also coupled to the ballast 100, controls a second pair of lamps. Thus, a single ballast 100 independently energizes first and second pairs of lamps housed in a four lamp light fixture.

Figure 5:
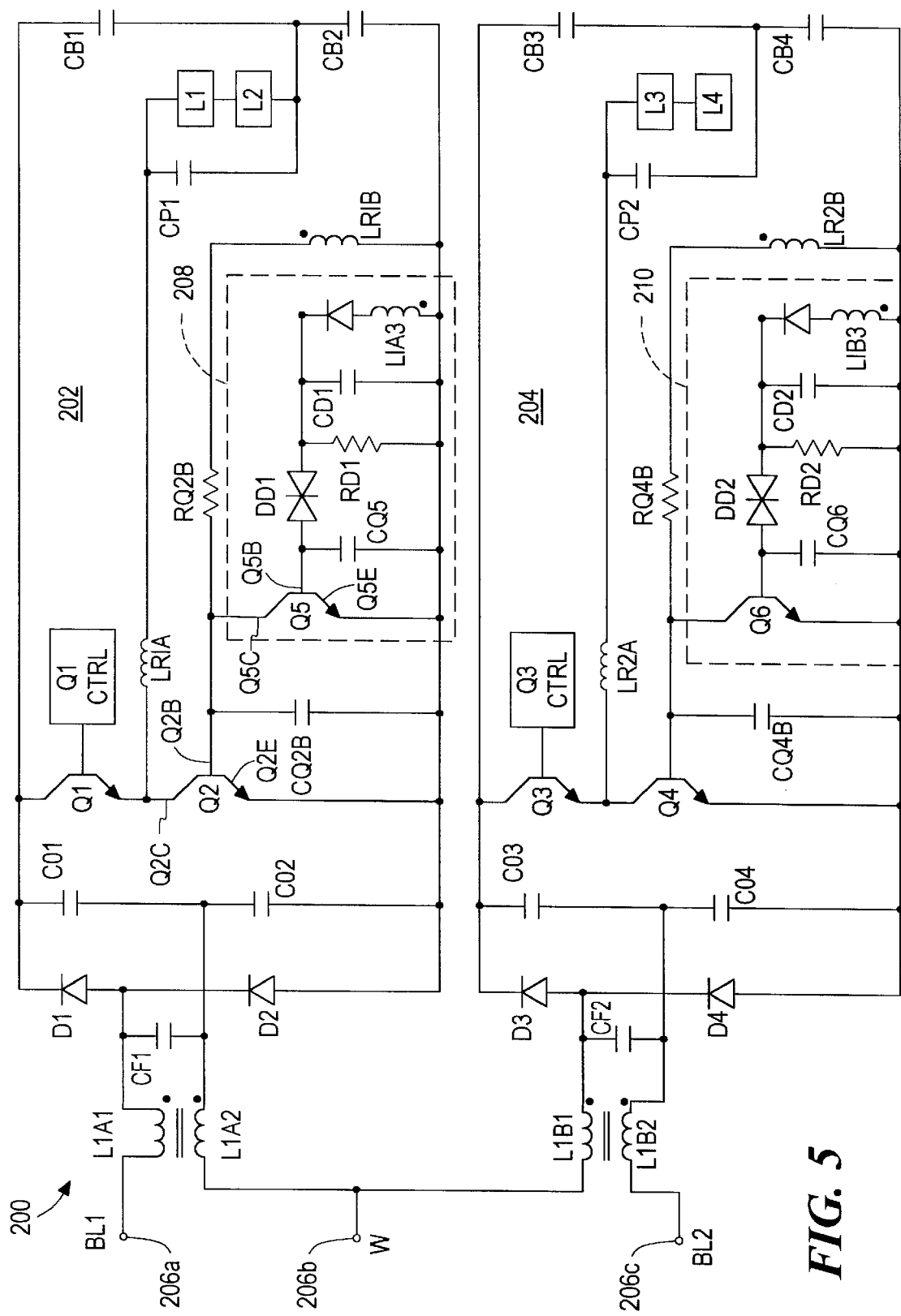
FIG. 5 is a further embodiment of a ballast in accordance with the present invention.

FIG. 5 shows an alternative embodiment of a ballast 200 having a dual inverter configuration providing independent control over a plurality of lamps. The first inverter 202 can have a half-bridge configuration formed from first and second switching elements Q1,Q2, and the second half-bridge inverter 204 can include third and fourth switching elements Q3,Q4. The first and second inverters 202,204 are independently controlled by a first AC input signal on first and second AC input terminals 206a,b, e.g., first black wire BL1 and a white wire W, and a second AC input signal on the second terminal 206b and a third AC input terminal 206c, e.g., the white wire W and a second black wire BL2. The first inverter 202 is disabled by a first inverter disable circuit 208 when the first AC input signal is not present and the second AC input signal is present. Similarly, the second inverter 204 is disabled by a second inverter disable circuit 210 when the first AC input signal is present and the second AC input signal is not present.

In one embodiment, a first inductor L1A1 is coupled to the first AC input terminal 206a and a second inductor L1A2, which is inductively coupled to the first inductor L1A1, is coupled to the second AC input terminal 206b. A third inductor L1A3, which is inductively coupled to the first and second inductors L1A1,L1A2, forms a part of the first inverter disable circuit 208. The first inverter disable circuit 208 can further include a capacitor CD1 and a first diac DD1 coupled to the base terminal Q5B of a transistor Q5, which has a collector terminal Q5C coupled to the base terminal Q2B of the second switching element Q2 of the first inverter 202.

Similarly, a fourth inductor L1B1 is coupled to the second AC input terminal 206b, a fifth inductor L1B2 is coupled to the third AC input terminal 206c, and a sixth inductor L1B3, which forms part of a second inverter disable circuit 210, is coupled to a sixth switching element Q6 for controlling a switching transistor Q4 of the second inverter 204. The second inverter disable circuit can further include a capacitor CD2 and a second diac DD2 coupled to the transistor Q6 for selectively disabling the second inverter.

In operation, the flux generated by the first and second inductive elements L1A1,L1A2 cancels each other when the first AC input signal is present on the first and second terminals. In the case where the second AC input signal is present, and the first AC input signal is not present, the flux generated by the second inductor L1A2 is not canceled such that a voltage is generated on the third inductor L1A3, which charges the capacitor CD1. When the voltage on the capacitor CD1 rises above a predetermined threshold, the first diac DD1 triggers and the fifth switching element Q5 transitions to the conductive state. This effectively prevents the second switching element Q2 of the first inverter from transitioning to the conductive state, thereby disabling the first inverter 202.

Similarly, when the first AC input signal is present and the second AC input signal is not present, a voltage is generated on inductive element L1B3 to disable the second inverter 210.

Figure 6:
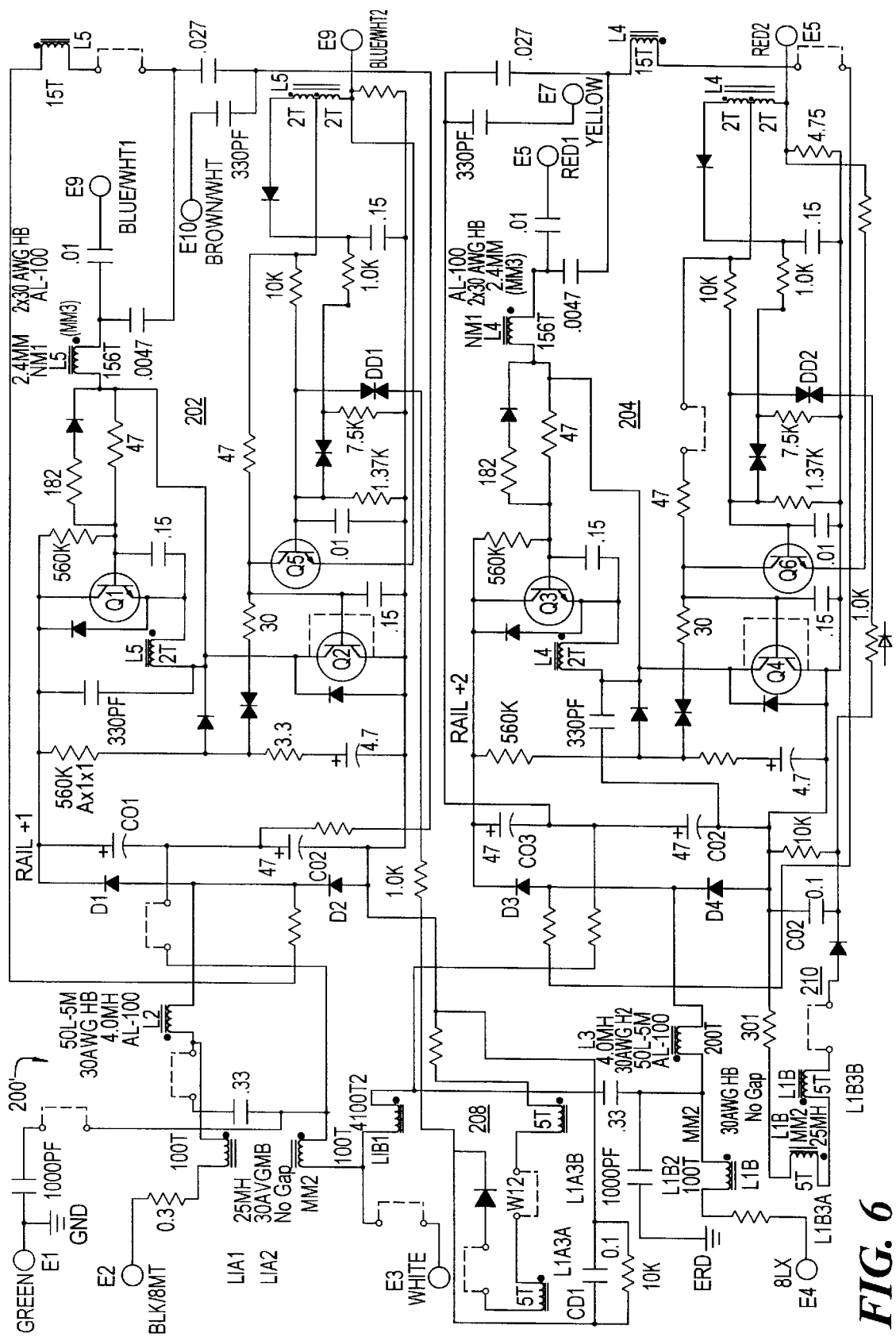
FIG. 6 is a circuit diagram of an exemplary embodiment of the ballast of FIG. 5.
Figure 7:
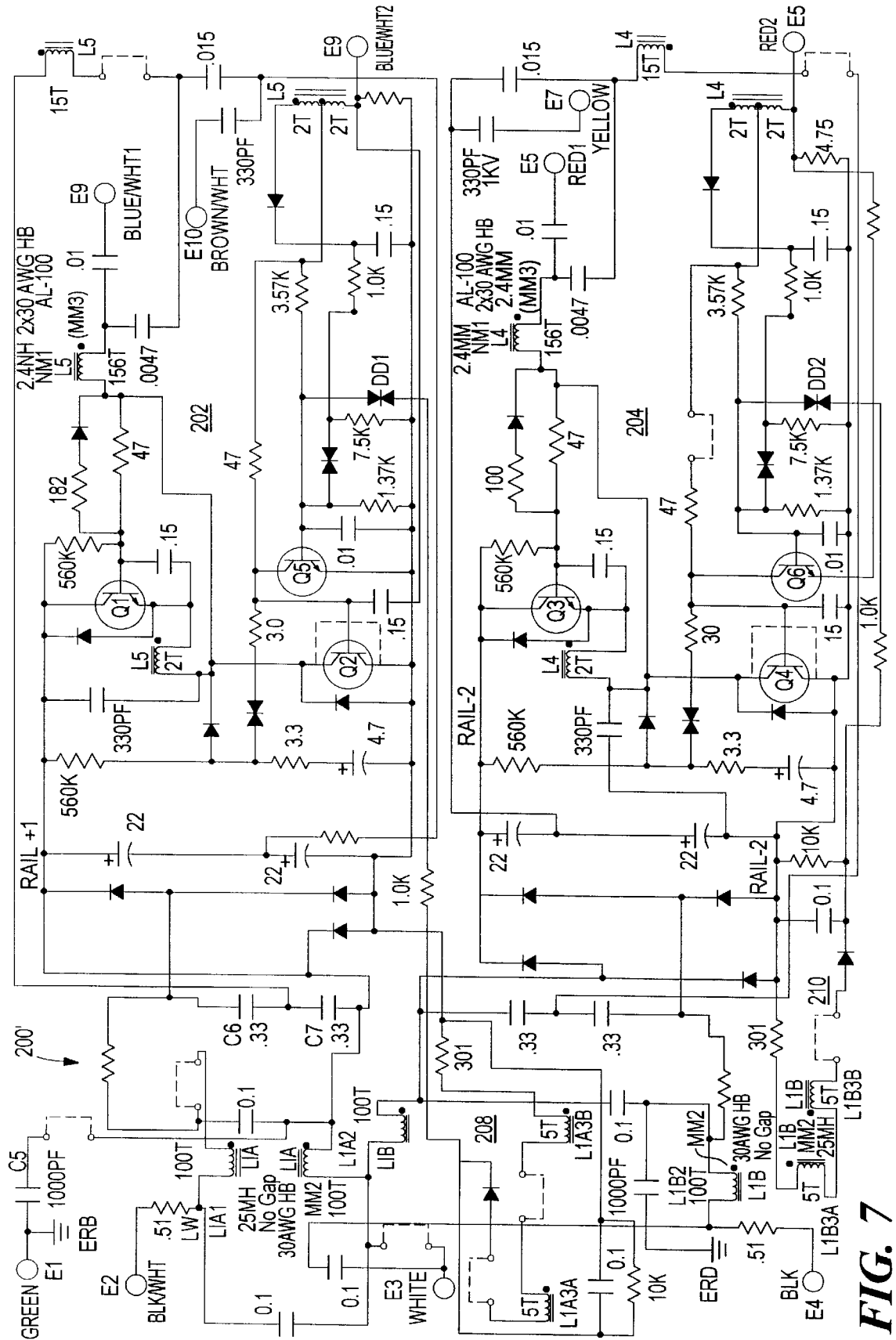
FIG. 7 is a circuit diagram of an alternative embodiment of the ballast of FIG. 5.

FIG. 6 shows an exemplary circuit implementation of the circuit 200 of FIG. 5 adapted for 120 V operation. FIG. 7 shows a similar circuit implementation adapted for 277 Volt operation. Various other features of these circuits are shown and described, for example, in co-pending and commonly owned U.S. application Ser. Nos. 09/173,850, 09/173,852, and 09/173,966, all filed on Oct. 16, 1998, and all incorporated herein by reference.

Figure 8:
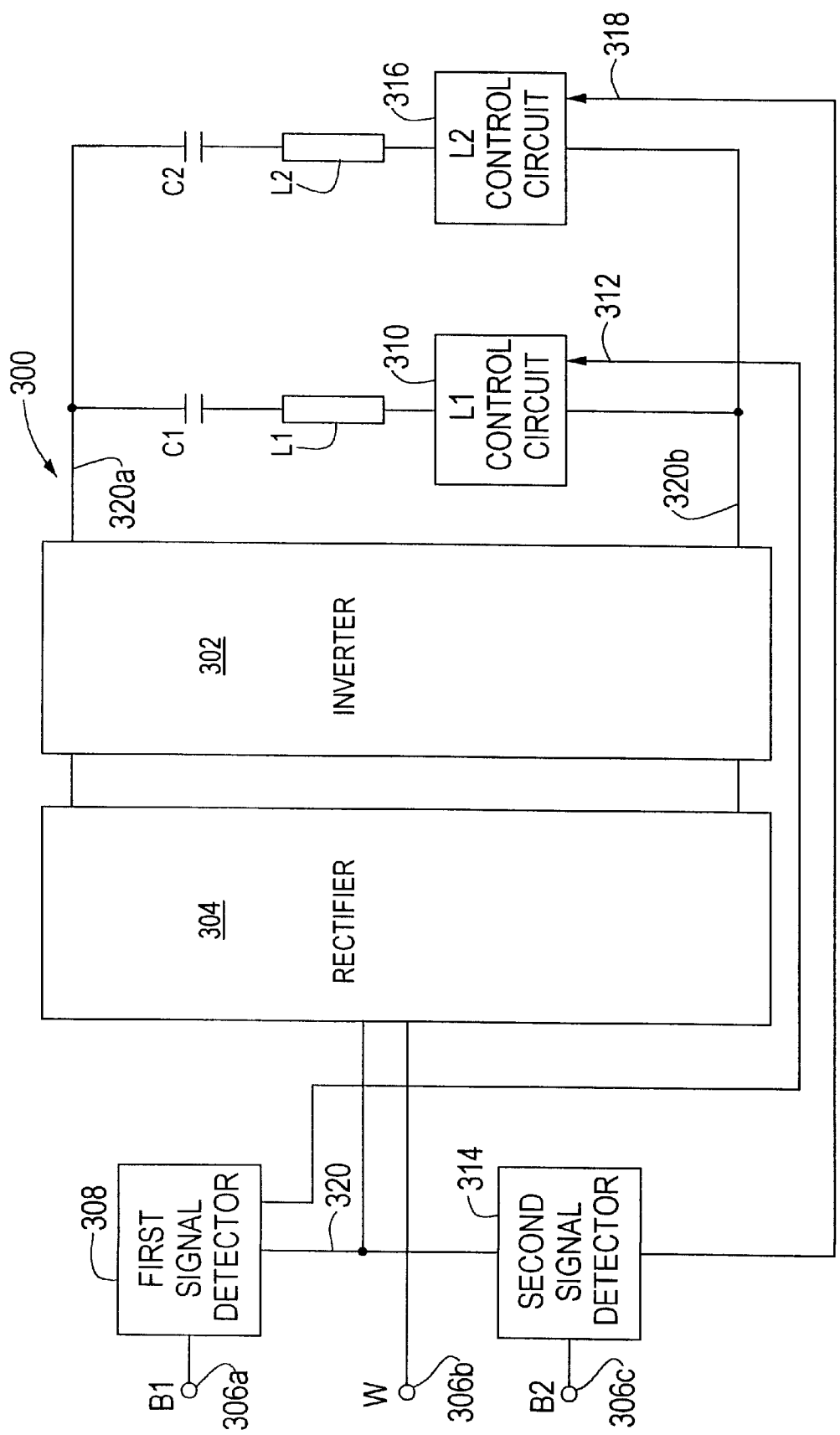
FIG. 8 is a schematic diagram of a further embodiment of a ballast in accordance with the present invention.

FIG. 8 shows a ballast 300 in accordance with the present invention that independently energizes first and second lamps L1,L2 with a common inverter 302 energized by a rectifier 304. In an exemplary embodiment, the ballast 300 includes a first input terminal 306a for coupling to a first black wire B1 and a second input terminal 306b for coupling to white wire W. A third input terminal 306c and the second input terminal 306b are adapted for coupling to a second black wire B2 and the white wire W, respectively. A first AC input signal corresponds to the first black wire B1 and the white wire W and a second AC input signal corresponds to the second black wire B2 and the white wire W.

A first signal detector 308 is coupled to the first input terminal 306a and to a first lamp control circuit 310 via a first control signal path 312. The first signal detector 308 provides a first control signal to the first lamp control circuit 310 that is indicative of whether the first AC input signal is present. A second signal detector 314 is coupled to the third input terminal 306c and to a second lamp control circuit 316 via a second control signal path 318. The second signal detector 314 provides a second control signal to the second lamp control circuit 316 that is indicative of whether the second AC input signal is present. The first and second signal detectors 308,314 are coupled together at a node 320 that is also connected to the rectifier 304. The second input terminal 306b is also connected to the rectifier 304.

The first lamp L1, a first capacitor C1 and the first lamp control circuit 310 form a first series circuit path and the second lamp L2, a second capacitor C2 and the second lamp control circuit 316 form a second series circuit path. The first and second series circuit paths are coupled across first and second terminals 320a,b of the inverter, which provide a drive signal to the first and second lamps L1,L2.

In one embodiment, the first lamp L1 is coupled between the first capacitor C1, which is coupled to the first inverter terminal 320a, and the first lamp control circuit 310, which is coupled to the second inverter terminal 320b. Similarly, the second lamp L2 can be coupled between a second capacitor C2 and the second lamp control circuit 316.

In operation, the rectifier 304 energizes the inverter 302 when either of the first and second AC input signals is present. When the first AC input signal is present on the first and second terminals 306a, b, the first signal detector 308 sends a "signal present" indication to the first lamp control circuit 310 via the first signal path 312. The first lamp control circuit 310 then enables the flow of current through the first lamp L1. Similarly, when the second AC signal is present on the second and third terminals 306b, c, the second signal detector 314 sends a "signal present" indication to the second lamp control circuit 316, which then enables the second lamp L2 to be energized.

In the case where the first and second AC input signals are both present, the first and second capacitors C1,C2 buffer the high frequency signal from the inverter 302 such that the first lamp to light does not prevent the other lamp from lighting due to excessive current draw by the first lighted lamp.

Figure 9:
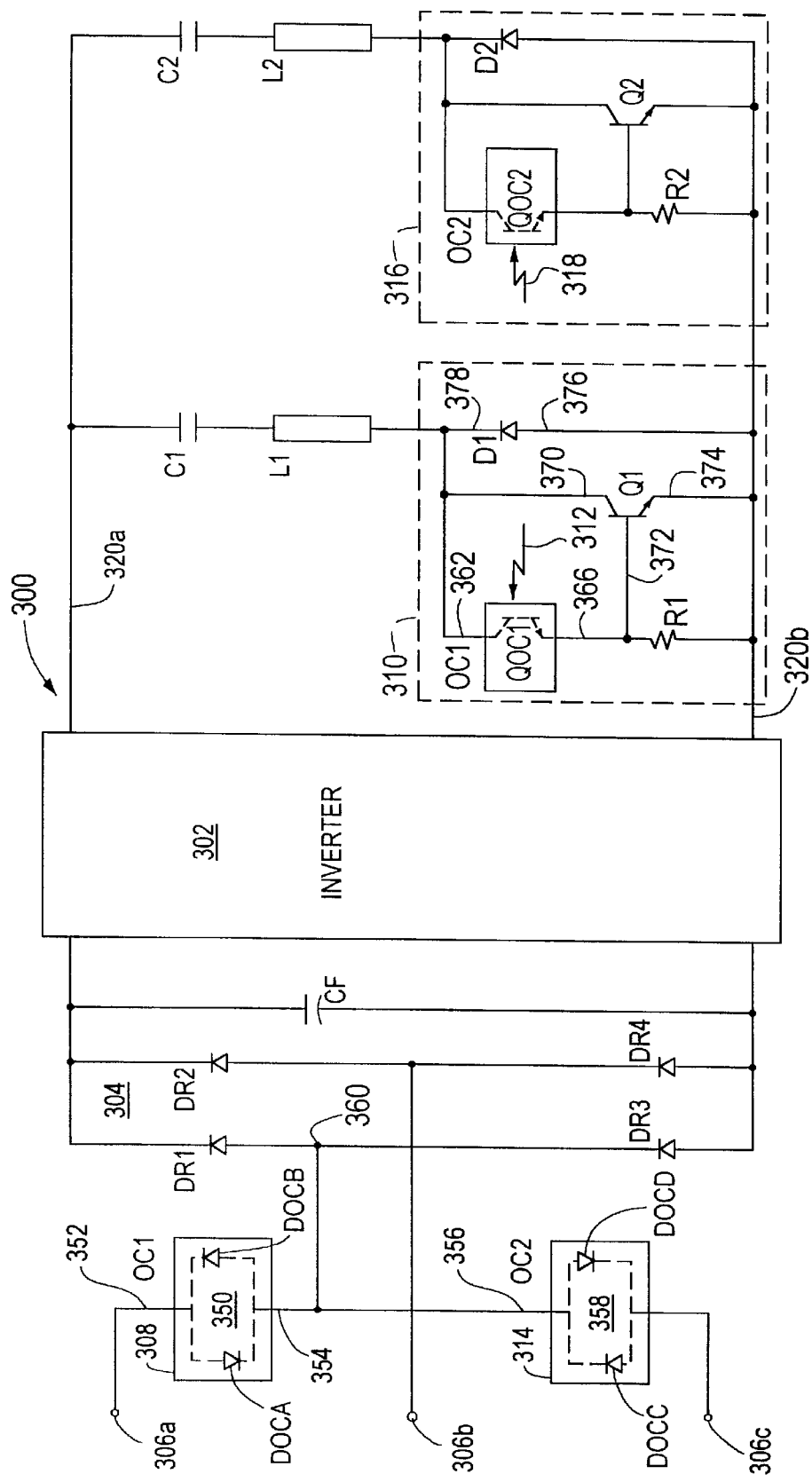
FIG. 9 is a circuit diagram of an exemplary implementation of the ballast of FIG. 8.

FIG. 9 shows an exemplary circuit implementation of the ballast 300 of FIG. 8. The first signal detector 308 includes a first optocoupler 350 having a first terminal 352 coupled to the first input terminal 306a and a second terminal 354 coupled to the first terminal 356 of a second optocoupler 358, which corresponds to the second signal detector 314. In one embodiment, the first optocoupler 350 includes first and second light emitting diodes DOCA,DOCB coupled in parallel and in opposite polarity. The second optocoupler 358 can include first and second diodes DOCC,DOCD connected in a similar manner.

The rectifier 304 includes diodes DR1–4 coupled in a full bridge configuration as shown. The node 360 formed by the second terminal 354 of the first optocoupler 350 and the first terminal 356 of the second optocoupler 358 is coupled to a point 360 between the first and third rectifier diodes DR1, DR3. The second AC input terminal 306b is coupled to a point between the second and fourth rectifier diodes DR2, DR4.

In one embodiment, the first lamp control circuit 310 includes a first optically coupled transistor QOC1 forming a part of the first optocoupler 350. The transistor QOC1 can include a collector terminal 362 coupled to the first lamp L1, a base terminal 364 optically coupled via signal path 312 to the first optocoupler diodes DOCA,DOCB, and an emitter terminal 366 coupled to the second terminal 320b of the inverter via a resistor R1. The first lamp control circuit 310 can further include a first control transistor Q1 having a collector terminal 370 connected to the collector terminal 362 of the first optically coupled transistor QOC1, a base terminal 372 coupled to the emitter 366 of transistor QOC1, and an emitter terminal 374 coupled to the second inverter terminal 320b. A first diode D1 includes an anode 376 coupled to the second terminal 320b and a cathode 378 coupled to the first lamp L1 and to the collector terminals of the transistors Q1,QOC1.

The second lamp control circuit 316 can also include a transistor QOC2 optically coupled to the second optocoupler 358 via signal path 318, a control transistor Q2, and a diode D2, coupled in manner similar to the first lamp control circuit 310.

When the first AC signal is present, the light emitting diodes (LEDS) DOCA,DOCB will bias the first optically coupled transistor QOC1 to a conductive state, which transitions the first control transistor Q1 to the conductive state. The conductive control transistor Q1 provides a path for current to flow from the first terminal 320a of the inverter to the second terminal 320b and the diode D1 provides a path for current to flow from the second terminal 320b to the first terminal 320a. Thus, the AC signal from the inverter 302 can energize the first lamp L1.

When the first AC signal is not present, the diodes DOCA,DOCB in the first optocoupler 350 are not activated and the first optically coupled transistor QOC1 does not bias the control transistor Q1 to a conductive state. Thus, there is no path for current to flow from the first inverter terminal 320a, thereby disabling the first lamp L1.

Similarly, when the second AC signal is present, the light emitting diodes DOCC,DOCD in the second optocoupler 358 are activated, which biases the second optically coupled transistor QOC2 to a conductive state. This transitions the second control transistor Q2 to the conductive state such that the transistor Q2 and the second diode D2 allow current flow between the first and second inverter terminals 320a,b to energize the second lamp L2.

Thus, the first AC input signal energizes the first lamp L1 independently of whether the second AC input signal is present and the second AC input signal energizes the second lamp L2 independently of whether the first AC signal is present. The ballast provides independent lamp control with a relatively high degree of circuit component commonality.

It is understood that the number of lamps can vary without departing from the invention. For example, first and second lamps coupled in series can be energized independently from third and fourth lamps coupled in series across first and second terminals of an inverter. It is further understood that the signal paths used to couple the signal detection circuits the lamp control circuits can includes conductive pathways, optical couplings, inductive couplings, and other such connections known to one of ordinary skill in the art. In addition, one of ordinary skill in the art will readily appreciate that other types of switching elements can be substituted for those shown and described herein and that the particular circuit arrangements can be modified.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of energizing first and second lamps by two AC input signals, comprising:
    coupling a first AC input signal to a ballast;
    coupling a second AC input signal to the ballast;
    energizing a first lamp when the first AC input signal is present regardless of whether the second AC input signal is present; and
    energizing the second lamp when the second AC input signal is present regardless of whether the first AC input signal is present.

2. The method according to claim 1, further including energizing the first and second lamps with a common inverter.

3. The method according to claim 1, further including controlling the first AC input signal with a first switch.

4. The method according to claim 3, further including controlling the second AC input signal with a second switch.

5. The method according to claim 1, further including detecting the first AC input signal with an optocoupler.

6. The method according to claim 5, further including optically coupling the optocoupler to a control circuit connected to the first lamp for selectively energizing the first lamp.

7. A method of energizing first and second lamps, comprising:
    coupling a first AC input signal to a ballast by receiving the first AC input signal on first and second input terminals
    coupling a second AC input signal to the ballast by receiving the second AC input signal on the second input terminal and a third input terminal;
    coupling a first inductor to the first input terminal;
    coupling a second inductor to the second input terminal;
    energizing a first lamp when the first AC input signal is present regardless of whether the second AC input signal is present; and
    energizing the second lamp when the second AC input signal is present regardless of whether the first AC input signal is present;
    wherein said steps of energizing said first and second lamps include the step of:
        coupling a third inductor to a switching element, wherein the first, second and third inductors are inductively coupled such that flux generated by the first and second inductors cancels each other when the first AC input signal is present, and wherein a signal on the third inductor, when the second AC input signal is present and the first AC input signal is not present, prevents the first lamp from being energized.

8. A ballast, comprising:
    first, second and third input terminals;
    a first signal detector coupled to the first input terminal for detecting a first AC input signal on the first terminal;
    a second signal detector coupled to the third input terminal for detecting a second AC input signal on the third terminal;
    a drive circuit for receiving the first and second AC input signals and providing an AC drive signal to first and second lamps;
    a first lamp control circuit for coupling to the first lamp;
    a second lamp control circuit for coupling to the second lamp;
    a first signal path connecting the first lamp control circuit to the first signal detector for carrying a first signal corresponding to a presence of the first AC input signal; and
    a second signal path connecting the second lamp control circuit to the second signal detector for carrying a second signal corresponding to a presence of the second AC input signal,
    wherein the first lamp is energized when the first AC input signal is present independently of whether of the second AC input signal is present, and wherein the second lamp is energized when the second AC input signal is present independently of whether the first AC input signal is present.

9. The ballast according to claim 8, wherein the drive circuit includes an inverter that provides the AC drive signal to the first and second lamps.

10. The ballast according to claim 9, wherein the drive circuit includes a rectifier circuit for receiving the first and second AC input signals and providing DC energy to the inverter.

11. The ballast according to claim 10, wherein the rectifier includes first, second, third and fourth diodes coupled in a full bridge configuration so as to provide first and second rectifier AC input terminals and first and second rectifier DC output terminals, and wherein the first signal detector is coupled to the first AC rectifier input terminal and to the second signal detector.

12. The ballast according to claim 11, wherein the second AC input terminal is coupled to the second AC rectifier input terminal.

13. The ballast according to claim 8, wherein the drive circuit includes a rectifier coupled to the second terminal and to the first and second signal detectors.

14. The ballast according to claim 8, wherein the drive circuit includes first and second output terminals on which the AC drive signal is provided, and wherein a first series circuit path between the first and second drive circuit output terminals includes a first capacitor, a first set of lamp terminals for receiving the first lamp, and the first lamp control circuit.

15. The ballast according to claim 14, wherein the first lamp control circuit includes a diode for providing a current path for current flowing from the drive circuit second output terminal to the first set of lamp terminals and a control switching element for providing a current path for current flowing from the first set of lamp terminals to the drive circuit second output terminal.

16. The ballast according to claim 15, wherein the first lamp control circuit further includes a first coupling switching element coupled to the first signal detector via the first signal path for controlling a conduction state of the first control switching element.

17. The ballast according to claim 16, wherein the first signal path between the first coupling switching element and the first signal detector circuit is an optical signal path.

18. The ballast according to claim 16, wherein the first signal detector and the first coupling switching element form part of an optocoupler.

19. The ballast according to claim 16, wherein the second lamp control circuit includes a second diode and a second control switching element, the second signal path between the second switching element and the second signal detector being an optical path.

20. The ballast according to claim 14, wherein a second series circuit path between the drive circuit first and second output terminals includes a second capacitor, a second set of lamp terminals, and the second lamp control circuit.

21. The ballast according to claim 20, wherein the first and second capacitors are effective to buffer current to the first and second lamps such that a first one of the first and second lamps to light is inhibited from drawing excessive current that prevents lighting of the other of the first and second lamps.

22. The ballast according to claim 8, wherein a first circuit loop includes a first capacitor, a first set of lamp terminals for receiving the first lamp, the first lamp control circuit, the second lamp control circuit, a second set of lamp terminals for receiving the second lamp, and a second capacitor.

23. The ballast according to claim 8, wherein the first signal path comprises an optical path.

24. The ballast according to claim 8, wherein the first signal detector includes an optocoupler.

25. A ballast circuit, comprising:
    first, second and third AC input terminals, the first and second AC input terminals being adapted for receiving a first AC input signal and the second and third AC input terminals being adapted for receiving a second AC input signal;
    a rectifier circuit for receiving the first and second AC input signals and providing a DC output signal;
    an inverter circuit for receiving the DC output signal and providing a drive signal for energizing first and second lamps;
    a first signal detector coupled to the first AC input terminal and to the rectifier;
    a second signal detector coupled to the third AC input terminal and to the rectifier at a point in common with first signal detector;
    a first lamp control circuit for coupling to the first lamp, the first lamp control circuit being optically coupled to the first signal detector; and
    a second lamp control circuit for coupling to the second lamp, the second lamp control circuit being optically coupled to the second signal detector,
    wherein the first lamp control circuit allows the AC drive signal to energize the first lamp when the first AC input signal is present independently of whether the second AC input signal is present, and the second lamp control circuit allows the AC drive signal to energize the second lamp when the second AC input signal is present independently of whether the first AC input signal is present.

26. The ballast according to claim 25, wherein the inverter provides the AC drive signal on first and second output terminals, and wherein the ballast includes first and second series circuit paths between the first and second inverter output terminals, the first series circuit path including a first capacitor, a first set of lamp terminals, and the first lamp control circuit, the second series circuit path including a second capacitor, a second set of lamp terminals, and the second lamp control circuit.

27. The ballast according to claim 26, wherein the first lamp control circuit includes a control switching element for providing a path for current to flow from the first lamp to the second inverter output terminal and a diode for providing a path for current to flow from the second inverter output terminal to the first lamp.

28. The ballast according to claim 27, wherein the first lamp control circuit includes a further switching element for controlling a conduction state of the control switching element, wherein the further switching element receives an optical signal from the first signal detector such that the presence of the first AC input signal determines the conduction state of the control switching element.

29. A ballast for energizing first and second lamps, comprising:
    first, second, and third AC input terminals, wherein the first and second AC input terminals are adapted for receiving a first AC input signal and the second and third AC input terminals are adapted for receiving a second AC input signal;
    a first circuit coupled to the first and second AC input terminals for receiving the first AC input signal and providing a first drive signal for energizing the first lamp, the first circuit including a first inverter controlled by a first inverter disable circuit;
    a second circuit coupled to the second and third AC input terminals for receiving the second AC input signal and providing a second drive signal for energizing the second lamp, the second circuit including a second inverter controlled by a second inverter control circuit;
    a first inductor coupled to the first AC input terminal;
    a second inductor coupled to the second AC input terminal; and
    a third inductor inductively coupled to the first and second inductors, the third inductor forming a part of the first inverter disable circuit,
    wherein a signal generated on the third inductor when the second AC input signal is present and the first AC input signal is not present is effective to disable the first inverter.

30. The ballast according to claim 29, further including a fourth inductor coupled to the second AC input terminal; a fifth inductor coupled to the third AC input terminal; and a sixth inductor inductively coupled to the fourth and fifth inductors, the sixth inductor forming a part of the second inverter disable circuit,
    wherein a signal generated on the sixth inductor when the first AC input signal is present and the second AC input signal is not present is effective to disable the second inverter.

31. The ballast according to claim 29, further including a first capacitor coupled to the fourth inductor such that a voltage on the first capacitor generated by the sixth inductor above a predetermined level is effective to disable the first inverter.

32. The ballast according to claim 31, further including a first diac coupled to the first capacitor.

33. A ballast for energizing first and second lamps, comprising:

first, second and third AC input terminals, the first and second AC input terminals for receiving a first AC input signal, and the second and third AC input terminals for receiving a second AC input signal;

a drive circuit for receiving the first and second AC input signals and energizing the first and second lamps, wherein the drive circuit energizes the first lamp when the first AC input signal is present at the first and second input terminals independently of whether the second AC input signal is present, and wherein the drive circuit energizes the second lamp when the second AC input signal is present independently of whether the first AC input signal is present.

34. A method of energizing first and second lamps, comprising:

coupling a first AC input signal to first and second AC input terminals of a ballast;

coupling a second AC input signal to a third terminal and the second terminal of the ballast;

energizing the first lamp when the first AC input signal is present on the first and second AC input terminals of the ballast; and energizing the second lamp when the second AC input signal is present on the second and third AC input terminals of the ballast.

* * * * *